US 9,602,435 B2

United States Patent
Yedavalli et al.

(10) Patent No.: US 9,602,435 B2
(45) Date of Patent: *Mar. 21, 2017

(54) PACKET BROADCAST MECHANISM IN A SPLIT ARCHITECTURE NETWORK

(71) Applicant: Telefonaktiebolaget L M Ericsson (publ), Stockholm (SE)

(72) Inventors: Kiran Yedavalli, San Jose, CA (US); Ramesh Mishra, San Jose, CA (US)

(*) Notice: Subject to any disclaimer, the term of this patent is extended or adjusted under 35 U.S.C. 154(b) by 24 days.

This patent is subject to a terminal disclaimer.

(21) Appl. No.: 14/603,777

(22) Filed: Jan. 23, 2015

(65) Prior Publication Data

US 2015/0139245 A1   May 21, 2015

Related U.S. Application Data (63) Continuation of application No. 13/196,717, filed on Aug. 2, 2011, now Pat. No. 8,971,334.

(51) Int. Cl.
| | |
|---|---|
| *H04L 12/28* | (2006.01) |
| *H04L 12/947* | (2013.01) |
| *H04L 12/24* | (2006.01) |
| *H04L 12/721* | (2013.01) |
| *H04L 12/18* | (2006.01) |
| *H04L 12/46* | (2006.01) |

(Continued)

(52) U.S. Cl.
CPC .......... *H04L 49/25* (2013.01); *H04L 12/1877* (2013.01); *H04L 12/1886* (2013.01); *H04L 12/4641* (2013.01); *H04L 41/0803* (2013.01); *H04L 41/12* (2013.01); *H04L 45/38* (2013.01); *H04L 49/15* (2013.01); *H04L 49/354* (2013.01)

(58) Field of Classification Search
CPC .......... H04L 45/02; H04L 45/04; H04L 45/10
See application file for complete search history.

(56) References Cited

U.S. PATENT DOCUMENTS

| | | | |
|---|---|---|---|
| 6,343,083 B1 * | 1/2002 | Mendelson | H04Q 11/0478 370/392 |
| 6,781,953 B1 * | 8/2004 | Naouri | H04L 12/1854 370/218 |

(Continued)

OTHER PUBLICATIONS

*OpenFlow Switch Specification; Version 1.1.0 Implemented (Wire Protocol 0x02)*; Feb. 28, 2011; 56 pages.

(Continued)

*Primary Examiner* — Michael J Moore, Jr.
*Assistant Examiner* — Siren Wei
(74) *Attorney, Agent, or Firm* — Nicholson De Vos Webster & Elliott, LLP (57) ABSTRACT

A method and system is implemented in a network node that functions as a controller for a domain in a split architecture network. The domain comprises a plurality of flow switches, where the plurality of flow switches implement a data plane for the split architecture network and the controller implements a control plane for the split architecture network that is remote from the data plane. The method and system configure the plurality of flow switches to efficiently handle each type of broadcast packet in the domain of the split architecture network without flooding the domain with the broadcast packets to thereby reduce a number of broadcast packets forwarded within the domain.

15 Claims, 11 Drawing Sheets

(51) Int. Cl.
*H04L 12/933* (2013.01)
*H04L 12/931* (2013.01)

(56) References Cited

U.S. PATENT DOCUMENTS

| | | | | |
|---|---|---|---|---|
| 6,928,074 | B1* | 8/2005 | Messager | H04L 12/1854 370/389 |
| 7,310,730 | B1* | 12/2007 | Champagne et al. | 713/163 |
| 2002/0145978 | A1 | 10/2002 | Batsell et al. | |
| 2004/0017808 | A1* | 1/2004 | Forbes | H04L 49/252 370/390 |
| 2005/0089327 | A1* | 4/2005 | Ovadia et al. | 398/47 |
| 2005/0111465 | A1 | 5/2005 | Stewart | |
| 2006/0143309 | A1 | 6/2006 | McGee et al. | |
| 2006/0215645 | A1* | 9/2006 | Kangyu | H04L 12/4641 370/360 |
| 2008/0049609 | A1* | 2/2008 | Chao | H04L 12/66 370/218 |
| 2008/0310326 | A1* | 12/2008 | Shaw | H04L 12/4633 370/254 |
| 2009/0080345 | A1* | 3/2009 | Gray | H04Q 3/66 370/255 |
| 2009/0135722 | A1 | 5/2009 | Boers et al. | |
| 2010/0077067 | A1 | 3/2010 | Strole | |
| 2011/0261825 | A1* | 10/2011 | Ichino | H04L 45/38 370/400 |

OTHER PUBLICATIONS

Casado, Martin, et al., "Rethinking Enterprise Network Control", *IEEE/ACM Transactions on Networking*, New York, NY, vol. 17, No. 4, Aug. 1, 2009, pp. 1270-1283.

McKeown, et al., "Openflow: enabling innovation in campus networks", *SIGCOMM*; vol. 32, No. 2, Apr. 2008, pp. 69-74.

* cited by examiner

PACKET BROADCAST MECHANISM IN A SPLIT ARCHITECTURE NETWORK

CROSS-REFERENCE TO RELATED APPLICATIONS

This application is a continuation of application Ser. No. 13/196,717, filed Aug. 2, 2011 (now U.S. Pat. No. 8,971,334, issued Mar. 3, 2015), which is hereby incorporated by reference.

FIELD

The embodiments of the invention are related to the broadcast of packets within a split architecture network. Specifically, the embodiments of the invention relate to a method and system for optimizing the use of resources in a domain when handling packets to be broadcast by identifying external ports for the domain and programming appropriate flows in the switches of the domain.

BACKGROUND

Figure 1:
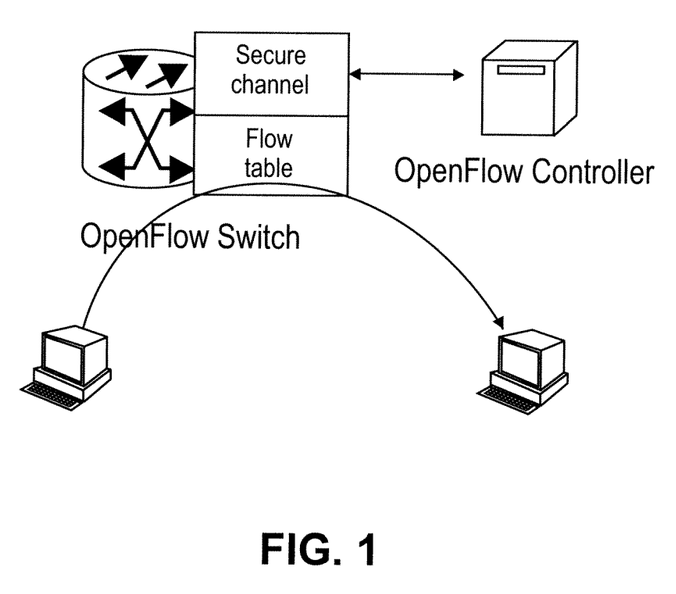
FIG. 1 is a diagram of one embodiment of an example configuration for a simple split architecture OpenFlow network.

A split architecture network is an alternate paradigm for network architecture. A split architecture network is composed of a number of nodes, such as routers or switches, like a traditional network architecture. However, in this paradigm, the control plane functionality of the network resides at a single central controller that can be in a single node of the network as illustrated in FIG. 1. This is in contrast to traditional network architecture where the control plane functionality resides on every node in the network. In a split architecture network, the network nodes are stripped of their control plane functionality and provide basic data plane functionality as 'flow switches.' A 'domain,' as used herein, is an area of a split architecture network where the flow switches are under the control of a single controller.

An example of a split architecture network is an OpenFlow based split architecture network. In an OpenFlow split architecture network, a controller and the flow switches in the data plane communicate using the OpenFlow Protocol. The OpenFlow protocol provides message infrastructure for the controller to program the flow switches in the data plane with appropriate flows for packet forwarding and processing. The controller can also obtain complete network state information for the network by querying each of the network nodes. An 'OpenFlow domain,' as used herein, is an area of an OpenFlow split architecture network where the flow switches are under the control of a single logical OpenFlow controller. This single logical OpenFlow controller can be implemented as a set or cluster of controllers responsible for a single domain of switches.

According to the OpenFlow protocol specification, the flow switches are programmed by the controller using the following primitives for packet forwarding and processing in the data plane: rules, which define matches on the packet header fields (such as Ethernet header fields, multi-protocol label switching (MPLS) header fields, and Internet protocol (IP) header fields); actions, which are associated with a rule match; and a collection of statistics for the flow that matches a rule. The flow switch applies the controller programmed rules on incoming packets and executes the associated actions on the matched flow, collecting statistics on the flow at the same time. FIG. 1 illustrates this basic OpenFlow protocol interface between the controller and the flow switch.

One of the main advantages of split architecture networks is that they allow independent optimizations in the control plane and the data plane. The components, functions or applications of the controller can be optimized independent of the underlying network, and similarly, the underlying network flow switch capabilities can be optimized independent of the controller components, functions and applications.

There are many situations that require a node in a network to send out a broadcast packet. These situations can be divided into two categories: a self-generated broadcast packet and a received broadcast packet. A node can self-generate a broadcast packet for specific protocol applications. An important example of a self-generated broadcast packet is the ARP REQUEST packet. Address Resolution Protocol (ARP) is used to resolve the media access control (MAC) address of a network node (router, or switch) given its IP address. In order to query a network node's MAC address, the requestor sends out an ARP REQUEST message. This message contains the query IP address and is broadcast to all devices in the network. The device whose IP address matches the one in the REQUEST message replies with its MAC address.

A node can also receive a packet that needs to be broadcast. A network node needs to broadcast the broadcast packet it receives on all active ports including the controller port. If the network node is configured with virtual local area networks (VLANs), it should broadcast the packet on all the active ports within the VLAN. Since the intelligence to forward packets resides in the controller in the OpenFlow domain, the controller needs to program the underlying flow switches appropriately for broadcast packets. The basic implementation of this configuration is to set the forwarding tables of each flow switch to blindly forward broadcast packets on all active ports for the flow switch.

SUMMARY

A method is implemented in a network node that functions as a controller for a domain in a split architecture network. The domain comprises a plurality of flow switches, where the plurality of flow switches implement a data plane for the split architecture network and the controller implements a control plane for the split architecture network that is remote from the data plane. The method configures the plurality of flow switches to efficiently handle each type of broadcast packet in the domain of the split architecture network without flooding the domain with the broadcast packets to thereby reduce a number of broadcast packets forwarded within the domain. The method comprising the steps of tracking a set of external ports for the domain, where each external port connects one of the plurality of flow switches to a device outside the domain, configuring each of the plurality of flow switches in the domain to forward a self-generated broadcast packet to each flow switch having at least one external port in the set of external ports for the domain without flooding the domain with the self-generated broadcast packet, configuring each of the plurality of flow switches having at least one external port from the set of external ports for the domain to forward a received control broadcast packet to the controller of the domain without flooding the domain with the received control broadcast packet, and configuring the plurality of flow switches in the domain to forward a received data broadcast packet to the set of external ports for the domain without flooding the domain with the received data broadcast packet.

A network node functions as a controller for a domain in a split architecture network. The domain comprises a plurality of flow switches, where the plurality of flow switches implement a data plane for the split architecture network and the controller implements a control plane for the split architecture network that is remote from the data plane. The network node configures the plurality of flow switches to efficiently handle each type of broadcast packet in the split architecture network without flooding the domain with broadcast packets to thereby reduce a number of broadcast packets forwarded within the domain. The network node comprises an external port tracking module to track a set of external ports for the domain, where each external port connects one of the plurality of flow switches to a device outside the domain, a broadcast configuration module communicatively coupled to the external port tracking module, the broadcast configuration module configured to configure each of the plurality of flow switches in the domain to forward a self-generated broadcast packet to each flow switch having at least one external port in the set of external ports for the domain without flooding the domain with the self-generated broadcast packet. The broadcast configuration module is configured to configure each of the plurality of flow switches having at least one external port from the set of external ports for the domain to forward a received control broadcast packet to the controller of the domain without flooding the domain, and configured to configure the plurality of flow switches for the domain to forward a received data broadcast packet to the set of external ports for the domain without flooding the domain with the received data broadcast packet.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 2, 6, 8, 9, 11 and 12. However, it should be understood that the operations of the flow diagrams in FIGS. 3-5, 7, 10 and 13 can be performed by embodiments of the invention other than those discussed with reference to FIGS. 2, 6, 8, 9, 11 and 12 and the embodiments discussed with reference to FIGS. 2, 6, 8, 9, 11 and 12 can perform operations different than those discussed with reference to the flow diagrams of FIGS. 3-5, 7, 10 and 13.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element or network node (e.g., a router, switch, bridge, or similar networking device.) is a piece of networking equipment, including hardware and software that communicatively interconnects other equipment on the network (e.g., other network elements or nodes, end stations, or similar networking devices). Some network elements or network nodes are "multiple services network elements" or "multiple services network nodes" that provide support for multiple networking functions (e.g., routing, bridging, switching, Layer 2 aggregation, session border control, multicasting, and/or subscriber management), and/or provide support for multiple application services (e.g., data collection). The terms network elements and network nodes are used herein interchangeably.

The embodiments of the present invention provide a method and system for avoiding the disadvantages of the prior art. The naïve implementation of handling broadcast packet forwarding is to blindly forward broadcast packets on all active ports in each node of the network. However, this is inefficient as many packets forwarded using this implementation are unnecessary to reach all the intended recipients. For both self-generated and received broadcast packet scenarios the broadcast packet needs only to be sent out on all external ports for the domain. External ports are defined as the ports of the domain (e.g., an OpenFlow domain) that are connected to network nodes or devices that are not under the control of the domain's controller.

Existing split architecture networks including OpenFlow split architecture networks do not provide an efficient mechanism for sending out self-generated broadcast packets out of the domain. For received broadcast packets, the flow switches are pre-programmed by the controller to flood the broadcast packets on all the active ports on all the switches in the domain. This simple mechanism is very inefficient in terms of the unnecessary usage of network resources to forward broadcast packets. For example, if an OpenFlow domain network has m links and n external ports, ideally a received broadcast packet should be sent out only on the n external ports. Using the current technology, it would be sent at least on all the m links and the n external ports. All the switch forwarding resources used to flood the packet on all the m links leads to inefficient use of network resources. In a typical network, m could be orders of magnitude larger than n, in this scenario, the resource usage inefficiency could be much higher.

The embodiments of the invention overcome these disadvantages of the prior art. The embodiments of the invention include a packet broadcast method and system that provide an efficient way to broadcast self-generated broadcast packets and an optimized solution for the handling of received broadcast packet scenario. The embodiments of the invention provide mechanisms to broadcast packets in multiple scenarios: self-generated broadcast packet, received control broadcast packet, and received data broadcast packet. These mechanisms are much more efficient than the standard implementation of blind forwarding described above.

For example, using the current technology, any broadcast packet would be flooded on all the ports on all the switches within the domain, leading to inefficient use of valuable network resources. The embodiments of the invention provide mechanisms for broadcasting packet handling that use network resource only in the required proportions, leading to major savings in network resources.

In one embodiment, the controller configures the flow switches of a domain to forward the broadcast packets directly to the relevant external ports without wasting the resources of other flow switches in the domain. The controller identifies external ports and programs appropriate flows in the underlying flow switches for packet forwarding.

Figure 2:
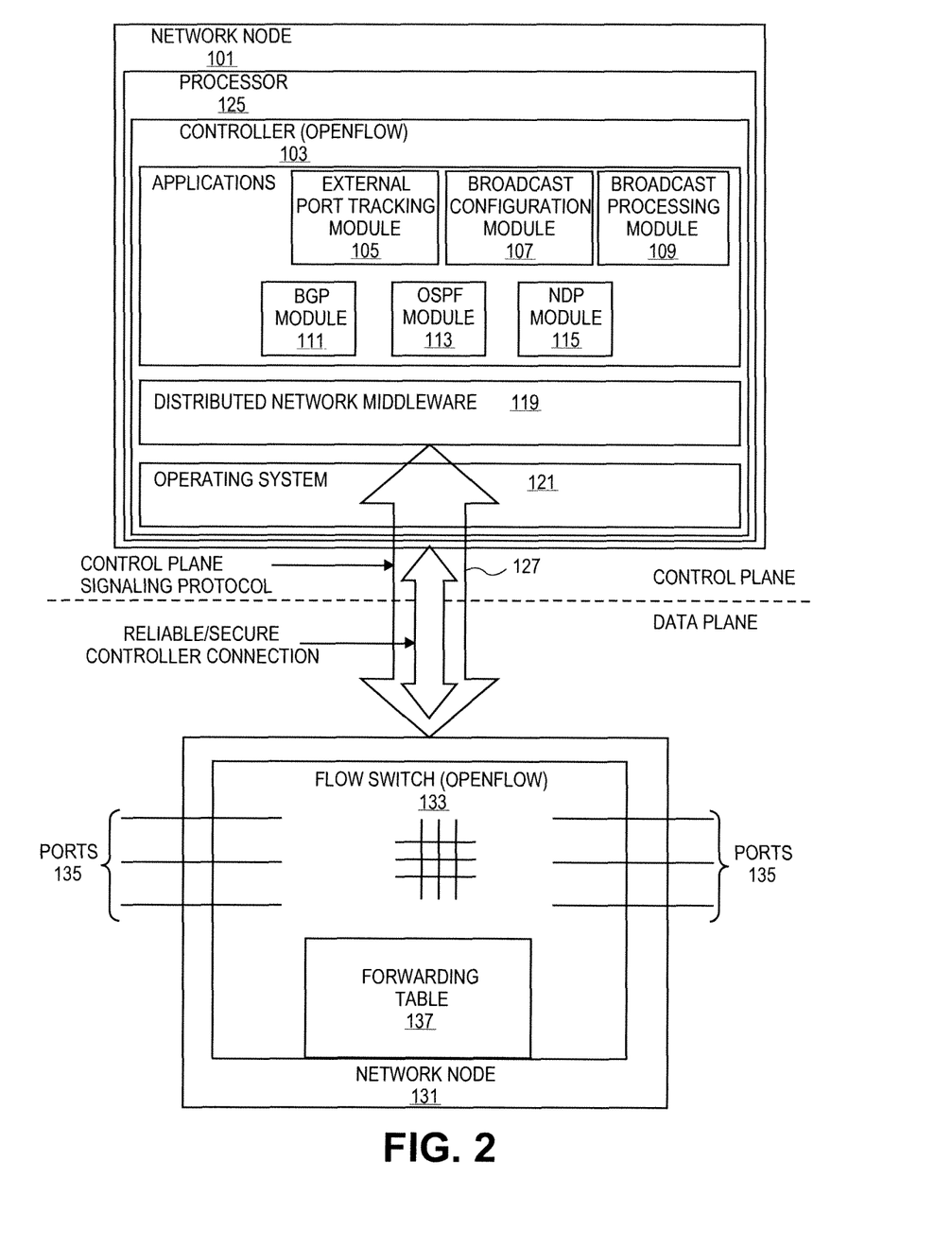
FIG. 2 is a diagram of one embodiment of controller in a control plane and flow switch of a data plane in a split architecture network.

FIG. 2 is a diagram of one embodiment of a controller and flow switch in a split architecture network with efficient broadcast packet handling. The controller 103 and flow switch 133 are implemented by network nodes 101, 131, respectively. These network nodes can be any type of networking element including routers, switches and similar devices. The network nodes 101, 131 can be in communication over any type of network including a local area network (LAN), a wide area network (WAN), such as the Internet, or over a similar network. The network can be composed of any combination of wired or wireless devices. The controller 103 can be in communication and be assigned to control any number of flow switches 133. For sake of clarity, a single flow switch is illustrated.

In one embodiment, the controller 103 and flow switch 133 are an OpenFlow controller and OpenFlow switch, respectively. OpenFlow is a system and protocol defined in the OpenFlow switching specification hosted at www.openflow.org. In other embodiments, other similar split architecture enabling protocols or systems are utilized to separate control plane functionality and data plane functionality.

In one embodiment, the controller 103 can be composed of a set of applications, a distributed network middleware 119 and an operating system 121. The distributed network middleware 119 provides a set of functions and data structures that support communication between the controller and other network nodes. The operating system 121 manages the resources of the network node 101 such as processor and memory resources. Any distributed network middleware and operating system can be utilized that provide these services.

The applications or components of the controller can include an external port tracking module 105, a broadcast configuration module 107, a broadcast processing module 109, a boarder gateway protocol (BGP) module 111, an open shortest path first (OSPF) module 113, a neighbor discovery protocol (NDP) module 115 and similar components. The BGP module 111 maintains a table of prefixes that designate network reachability among autonomous systems. The OSPF module 113 calculates a shortest path across a network topology. The NDP module 115 can advertise the capabilities and characteristics of a network node to its neighbors to enable communication between the network nodes. Similarly, the NDP module 115 discovers neighbors by receiving advertisements from these neighbors over connecting links between domains. In another embodiment, the switches implement NDP and report the discovered neighbors and links to the NDP module 115 of the controller. Examples of NDP are link layer discovery protocol (LLDP) and CISCO discovery protocol (CDP) by CISCO SYSTEMS, Inc.

An external port tracking module 105 creates and maintains a list of all external ports for a domain of the controller. The function of the external port tracking module 105 is to determine a set of external ports for the domain. The external port tracking module 105 functions in conjunction with other modules such as the NDP module to communicate with the flow switches to identify their external ports. This process is described in further detail in regard to FIGS. 11-13. The external port tracking module 105 can also track internal ports and all active ports separately or as a part of the process of tracking external ports.

The broadcast configuration module 107 manages the configuration of flow switches in the domain to properly handle received and self-generated broadcast packets. The process of configuring the flow switches is described in further detail in regard to FIGS. 3-7. The broadcast processing module 109 handles broadcast packets received by or self-generated by the controller 103. The controller 103 can generate packets to be broadcast or can receive broadcast packets forwarded by the flow switches in its domain. The broadcast processing module 109 can function in conjunction with other modules such as the BGP module to process received broadcast packets. The processing of the broadcast packets is described in further detail in regard in further detail herein below.

The operating system 121 and distributed network middleware 119 can facilitate the communication between the controller 103 and the flow switches 133 by providing a secure communication channel 127 over which control plane signaling protocols can be transmitted. In one embodiment, the controller 103 and the flow switch 133 communicate using the OpenFlow protocol.

The flow switch 133 is provided by a network node 131. The network node 131 and flow switch 133 can be connected to any number of other network nodes or similar devices. Each of these connections is through a separate communication port, herein referred to simply as 'ports.' These ports 135 can be connections with other network nodes within the same domain or with network nodes or devices outside the domain. The ports 135 that are connected with network nodes within the domain are referred to herein as 'internal ports.' The ports 135 that are connected with nodes outside of the domain are referred to herein as 'external ports.'

The flow switch 133 can receive, generate and/or forward data packets including broadcast packets. A forwarding table 137 or similar data structure defines a set of rules that determine how the flow switch handles each of the data packets. The forwarding table 137 can be an OpenFlow forwarding table or similar type of forwarding table that includes a set of rules for identifying and taking action on a variety of differing types of data packets. The controller 103 configures this forwarding table 137 to manage the forwarding behavior of the flow switch 133, for example by establishing rules for handling broadcast packets.

Figure 3:
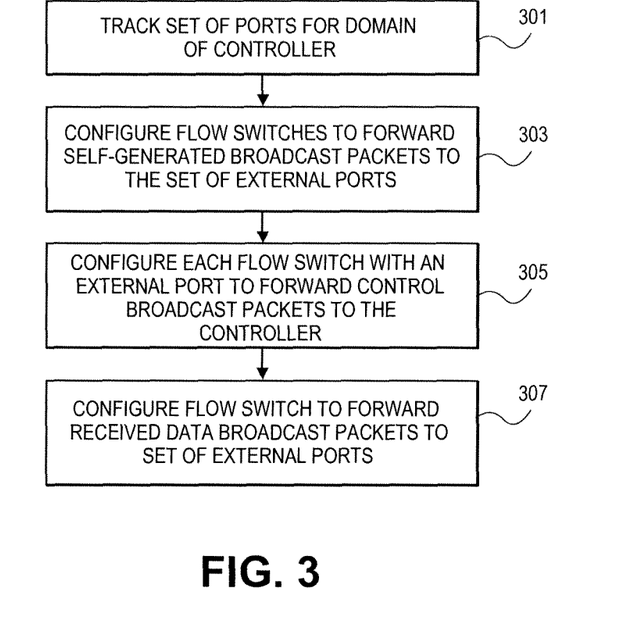
FIG. 3 is a flowchart of one embodiment of a process for configuring the split architecture network for efficient handling of broadcast packets.

FIG. 3 is a flowchart of one embodiment of a process for configuring the split architecture network for efficient handling of broadcast packets. This process is performed by the components of a controller to configure a set of flow switches in its domain to efficiently handle various types of broadcast packets. The controller tracks a set of external ports for its domain within the split architecture network (Block 301). A 'set,' as used herein refers to any whole number of items including one item. The external ports can be tracked in any type of data structure such as a list, table or similar data structure. The process of identifying external ports is discussed herein below in further detail with regard to FIGS. 11-13.

The process continues by configuring all flow switches with external ports in the domain to forward self-generated broadcast packets to each of the set of external ports that have been identified (Block 303). The configuration can be carried out using a control plane protocol to configure the forwarding rules for each flow switch in the domain. A self-generated broadcast packet is a broadcast packet created by a flow switch within the domain. This self-generated broadcast packet (e.g., an ARP message) need only be sent to network nodes outside of the domain, because the flow switches share a controller, which already has access to the information needed to configure the flow switches within the domain. Therefore, it is a waste of resources to flood internal ports of the domain with these self-generated messages. These self-generated broadcast messages are created at the controller which directly sends the message to each external port of the domain based on its maintained external port list.

The process configures each flow switch in the domain with an external port to forward received control broadcast packets to the controller (Block 305). Received control broadcast packets are received by flow switches with external ports from devices external to the domain. The information within the received control broadcast packet is only relevant to the controller. Thus, the flow switches are configured to send this information to the controller instead of flooding internal ports with this received control broadcast packet, which isn't needed by the other flow switches in the domain. An example of a received control broadcast packet is an ARP message received from a device external to the domain of the controller. The controller will then forward this received control broadcast packet on all external ports, similar to a self-generated packet. The controller can also process the information of the received control broadcast packet that has been forwarded by the flow switch.

The controller configures the flow switches in its domain to forward received data broadcast packets to the set of external ports for the domain (Block 307). These data broadcast packets do not require control plane processing and do not need to be forwarded to the controller. The controller configures a set of flows between all sets of external ports such that each data broadcast packet that is received on an external port is forwarded across the domain to each other external port. The use of established flows to perform this processing avoids blindly forwarding the received data broadcast packet on all internal ports within the domain, which wastes resources. The flows ensure that the received data broadcast packet reaches each external port without the use of flooding. The flows can also be established to ensure that each flow switch receives the data broadcast packets without using flooding. Flows enable the forwarding of these packets such that the data packets are directed to each external port with a shortest path or similar configured path set by the controller.

Figure 4:
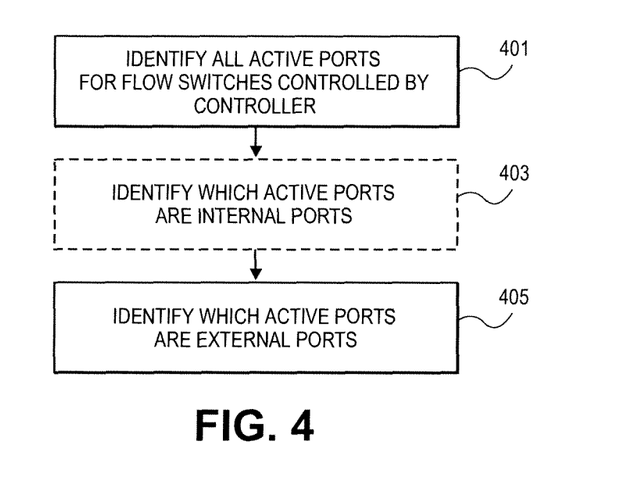
FIG. 4 is a flowchart of one embodiment of the process of tracking external ports.

FIG. 4 is a flowchart of one embodiment of the process of tracking external ports. This process is performed by the controller. The controller uses either an explicit process or an implicit process to determine the external ports. The explicit process and implicit process are discussed in further detail in regard to FIGS. 11-13. The process first identifies all active ports for the flow switches within the domain of the controller (Block 401). Optionally, the controller may identify the internal ports within the active port list (Block 403). Depending on the implementation of the split architecture network and the control plane protocol the controller may need to determine the internal ports to deduce the set of external ports. In other embodiments, the controller can directly determine the set of external ports. The controller determines the set of external ports and uses this for the configuration of the flow switches to efficiently handle broadcast packets (Block 405).

Figure 5:
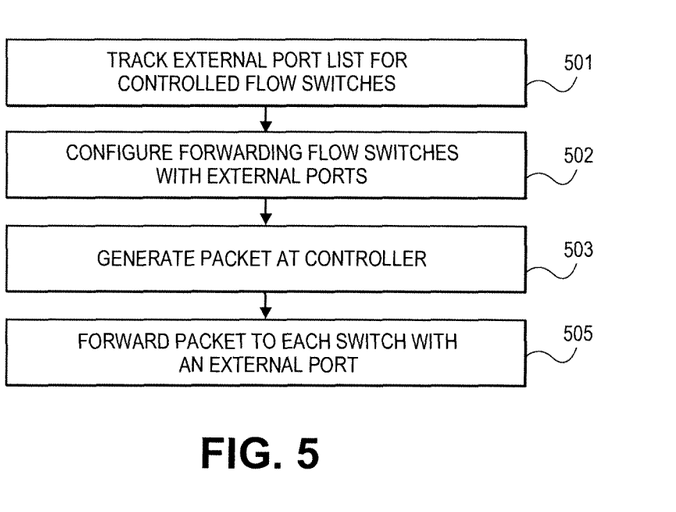
FIG. 5 is a flowchart of one embodiment of a process for handling self-generated broadcast packets.

FIG. 5 is a flowchart of one embodiment of a process for handling self-generated broadcast packets. This process relies on the tracking of the external ports as described above in regard to FIG. 4 and further described below in regard to FIGS. 11-13 (Block 501). The self-generated packet is created by the controller (Block 503). An example of a self-generated packet is an ARP message. The controller uses the external port list to direct the forwarding the packet to the flow switches with external ports (Block 505). The controller uses a flow or secure channel established with each flow switch to forward the self-generated packet.

Figure 6:
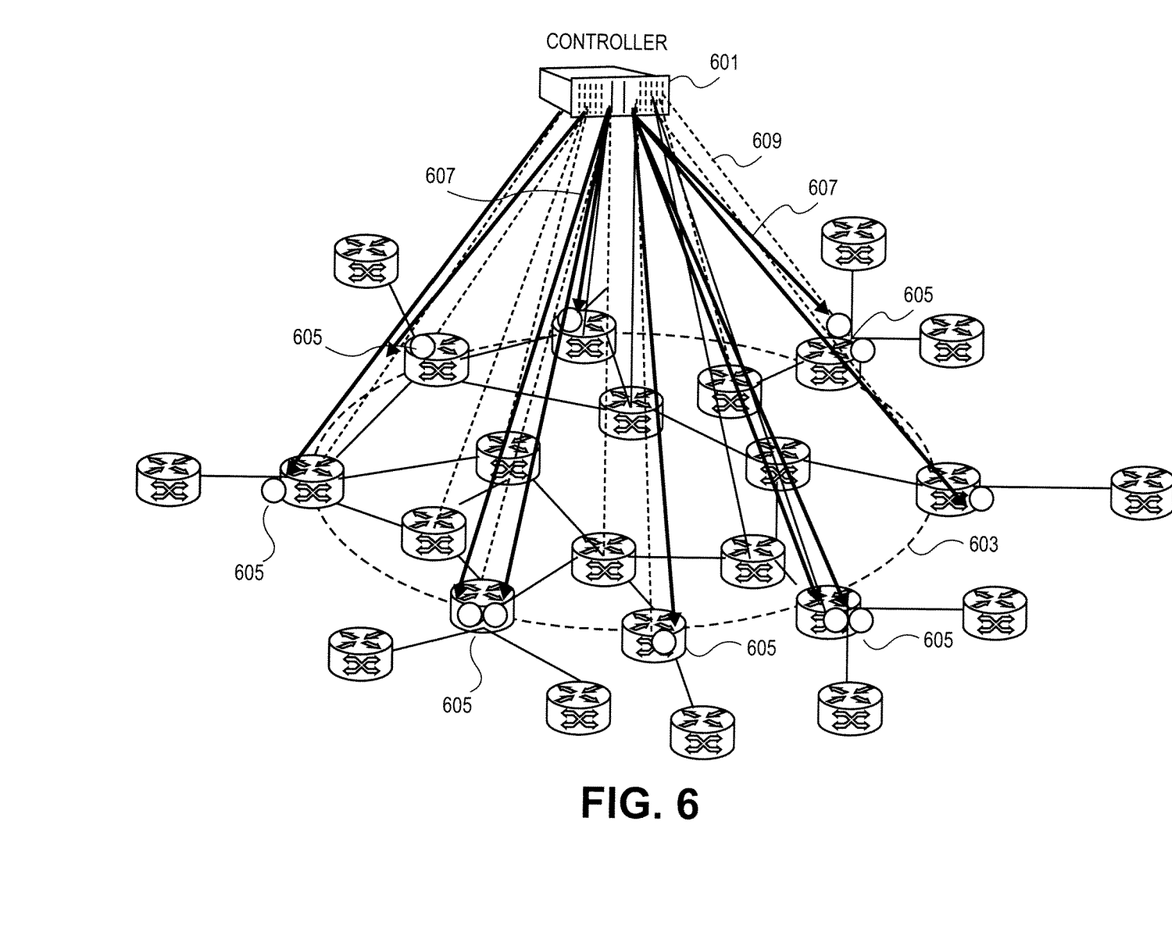
FIG. 6 is a diagram of an example split architecture network where a controller is processing a self-generated packet.

FIG. 6 is a diagram of an example split architecture network where a controller is processing a self-generated packet. The domain is identified with a dashed line 603. All flow switches on or within the dashed line 603 are part of the domain of the controller 601. External ports are labeled with circles 605. The self-generated packet is forwarded from the controller to each flow switch with an external port 605. The solid black arrow lines 607 show the forwarding of the self-generated packets. The dotted lines 609 shows the control communication channel or secured channel established to allow control protocol communications between the controller 601 and all flow switches. The self-generated packets can be forward over these control communication channels or through other similar paths to the external ports 605. The self-generated packets are not flooded over the internal ports of the domain, thereby reducing the resources needed to properly forward the self-generated packet.

Figure 7:
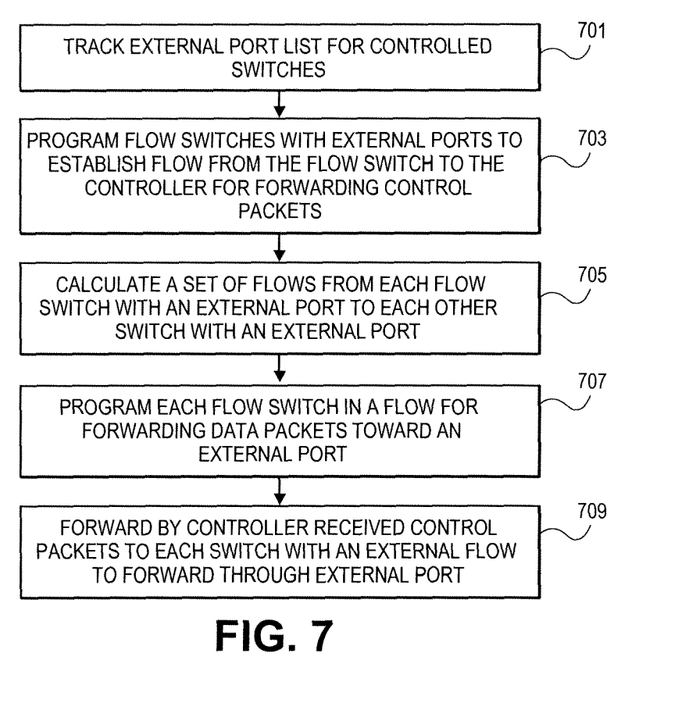
FIG. 7 is a diagram of one embodiment of a process for configuring and processing received broadcast packets.

FIG. 7 is a diagram of one embodiment of a process for configuring and processing received broadcast packets. Received broadcast packets are broadcast packets received through an external port of a flow switch in the domain of the controller. The received broadcast packets are therefore received from a network node or device that is external to the domain.

This process also relies on the availability of an external port list and assumes that this external port list is being created and maintained as described above in regard to FIG. 4 and herein below in regard to FIGS. 11-13 (Block 701). The controller executes this process or directs the execution of this process. The controller programs each flow switch in its domain that has an external port to establish a flow from that flow switch to the controller (Block 703). This flow is designed to limit the forwarding of these control packets to only forward them from the flow switch where these messages are received from an external device to the controller. The received control packet is not broadcast on the internal ports of the domain thereby conserving resources in the split architecture network.

In one embodiment, the flow switches with external ports are programmed to analyze incoming packets to look for matches on the destination MAC address that indicate the incoming packet is a broadcast packet. For example, the MAC addressed FF:FF:FF:FF:FF:FF can be utilized to identify a broadcast packet. For each detected broadcast packet, the ethertype of the incoming packet is examined to determine if the packet is a control packet. The flow switches are configured with an action to forward any packets that have a destination indicating a broadcast packet and an ethertype that indicates a control packet. For example, an ARP request packet can be received that has the FF:FF:FF:FF:FF:FF MAC address and an ethertype indicating a control packet. Those packets that meet these criteria are then programmed to be forwarded to the controller using a rule or similar configurable action within the flow switch.

The controller then calculates a set of flows from each flow switch in the domain that has an external port to each other flow switch with an external port (Block 705). The flows can be shortest paths between external ports or similar paths across the domain. The controller can calculate these paths using its knowledge of the topology of its domain.

After the set of flows are calculated, the controller programs each flow switch along a flow to forward data broadcast packets toward an external port associated with the flow (Block 707). In other embodiments, the flows can also be established to ensure efficient dissemination of the data broadcast packets to all flow switches in the domain without flooding the data broadcast packets within the domain. The flows can be either unicast or multicast paths or any combination thereof. These paths can be shortest paths as determined by a shortest path algorithm, such as Dijkstra's algorithm or similar processes. In one embodiment, the flow switches are programmed to analyze the received data broadcast packets to determine whether they are broadcast packets (e.g., matching on a MAC address of FF:FF:FF:FF:FF:FF). An ethertype is also analyzed for the packets to determine whether they are control or data packets. If the received data packet is a data broadcast packet, then the flow switch is configured to forward it along a set of associated flows. This avoids blind forwarding of these packets and avoids forwarding these packets to the controller.

After the flow switches are properly configured, the processing of broadcast packets commences. The controller's role in the processing of the broadcast packets includes processing received control broadcast packets from the flow switches and then forwarding them to each flow switch with an external port to be forwarded on each external port of the domain (Block 709).

Figure 8:
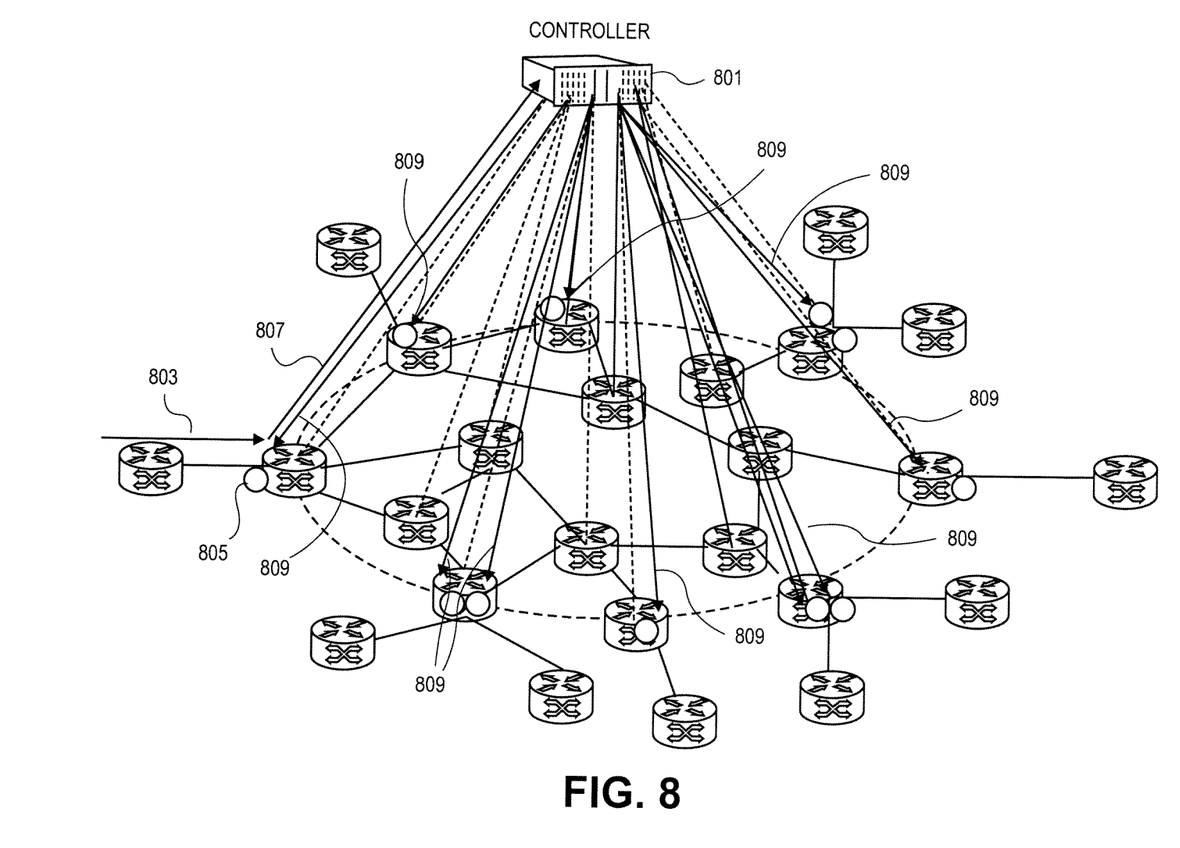
FIG. 8 is a diagram of one embodiment of a domain and controller processing a received control broadcast packet.

FIG. 8 is a diagram of one embodiment of a domain and controller processing a received control broadcast packet. A control broadcast packet 803 is received at an external port 805. The flow switch with external port 805 has been configured to forward 807 the received control broadcast packet to the controller 801. The flow switch does not flood the domain with the received control broadcast packet.

The controller 801 processes the packet as necessary and forwards the control broadcast packet 809 to each flow switch with an external port. Each of these flow switches then forwards the control broadcast packet on the associated external ports. This ensures the proper dissemination of the received control broadcast packet, while avoiding unnecessarily flooding the internal ports and links of the domain with the received control broadcast packet.

Figure 9:
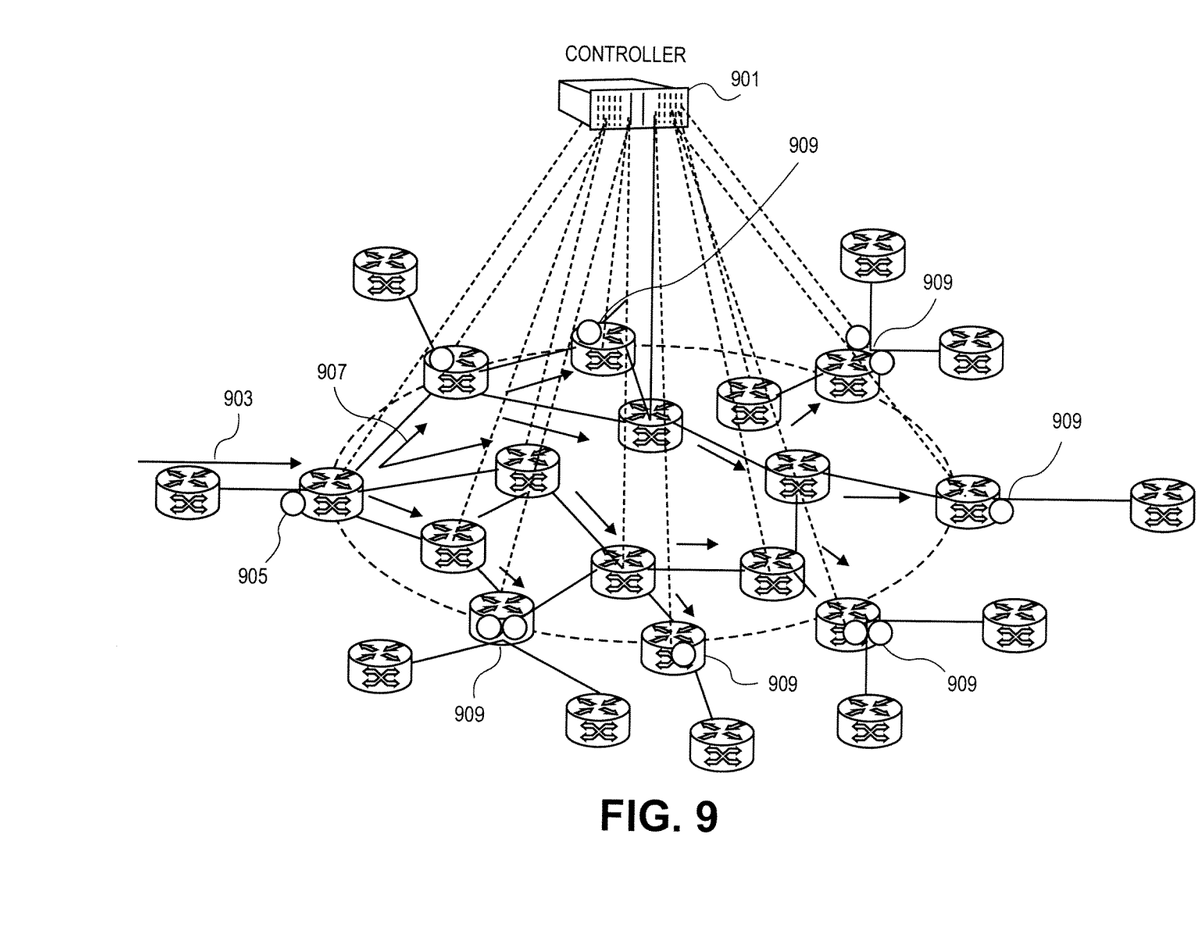
FIG. 9 is a diagram of one embodiment of a domain and controller processing a received data broadcast packet.

FIG. 9 is a diagram of one embodiment of a domain and controller processing a received data broadcast packet. A data broadcast packet 903 is received at an external port 905. The flow switch with external port 905 has been configured to forward 907 the received data broadcast packet along a set of flows configured by the controller. The flows direct the forwarding of the received data broadcast packet to each of the other external ports 909. The flow switches associated with the other external ports 909 received the data broadcast packet and forward the pack on the external ports. Thus, the received data broadcast packet is forwarded through the domain to each external port without flooding the internal links and without forwarding the packet to the controller.

Figure 10:
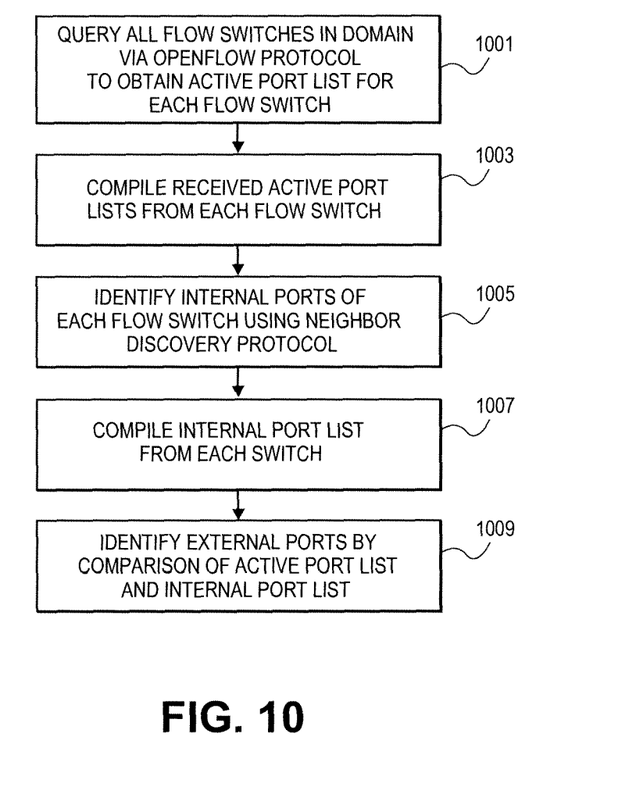
FIG. 10 is a flowchart of one embodiment of a process for implicit external port identification.

FIG. 10 is a flowchart of one embodiment of a process for implicit external port identification. In this process, the external ports are identified by eliminating internal ports from the list of active ports. In one embodiment, the Open-Flow protocol can be utilized to obtain a list of all the active ports for all the flow switches in a domain. In other embodiments, link level or switch level discovery protocols are utilized to determine active and internal ports in the domain.

The process is initiated by the controller querying all of the flow switches in the domain to generate an active port list for each flow switch (Block 1001). In one embodiment, the query is carried out by use of the OpenFlow protocol. As answers to the query are received from each flow switch in the domain, the lists of active ports are compiled into a list of active ports for the domain (Block 1003). Once the active port list has been compiled, the controller uses NDP, such as LLDP, to determine which of the active ports are internal ports of the domain (Block 1005). As the lists of internal ports are received, the controller compiles them into a list of internal ports for the domain (Block 1007).

The external ports from the domain can then be determined by a comparison of the internal port list of the domain and the active port list of the domain (Block 1009). All active ports that are not listed as internal ports are deduced to be external ports. An external port list can then be maintained for use in broadcast packet handling. This can be an ongoing process with the active port list, internal port list and external port list being continuously or periodically updated or recalculated.

Figure 11:
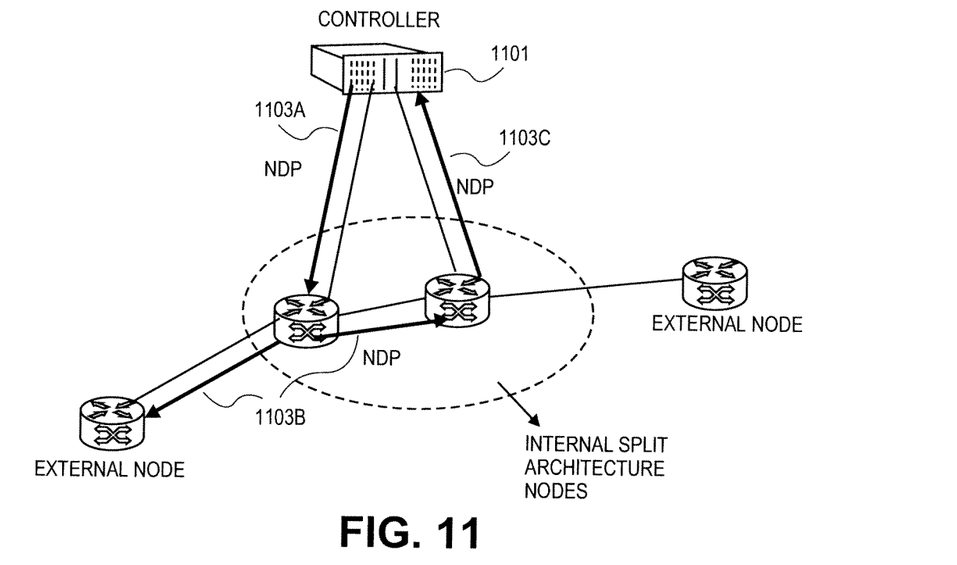
FIG. 11 is a diagram of one embodiment of implicit external port determination using neighbor discovery protocols.

FIG. 11 is a diagram of one embodiment of implicit external port determination using a neighbor discovery protocol. The controller sends out an NDP message 1103A on each of its ports. This NDP message 1103A is forwarded by the receiving network element on its ports 1103B. The NDP message 1103C then returns to the controller 1101, thereby enabling the controller 1101 to determine that the route of the NDP message 1103B is an internal route covering internal links of the domain. Once all internal links are determined, external ports can be deduced from this information and the list of all active ports.

Figure 12:
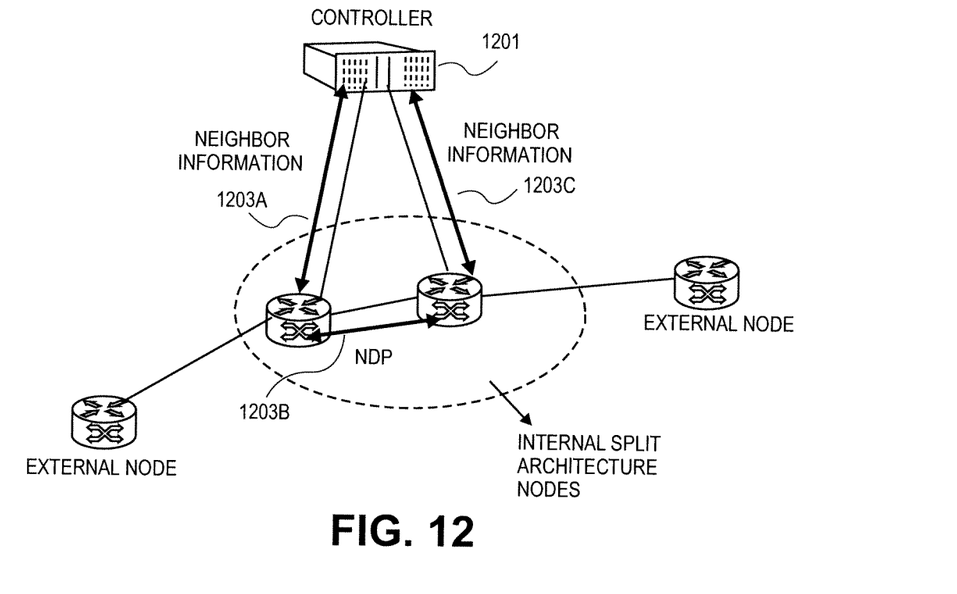
FIG. 12 is a diagram of one embodiment of implicit external port determination using switch level discovery protocols.

FIG. 12 is a diagram of one embodiment of implicit external port determination using switch level discovery protocols. The controller 1201 communicates with each flow switch 1203A, C in the domain to initiate the sending of switch level discover protocol messages 1203B between the flow switches. The flow switches then report there link information to the controller, such that the controller can determine that the links and ports are either internal or external.

Figure 13:
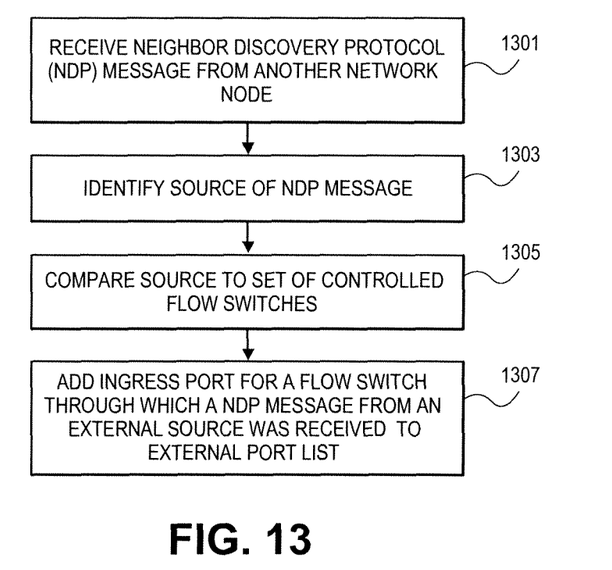
FIG. 13 is a flowchart of one embodiment of an explicit process for external port identification.

FIG. 13 is a flowchart of one embodiment of an explicit process for external port identification. In this embodiment, the external ports are identified using a neighbor discover protocol (NDP) such as link level discovery protocol (LLDP) or a similar protocol. This embodiment requires that external devices communicating with the flow switches and controller of the domain support the same NDP as the controller. External ports are recognized when NDP messages are received from devices that are not part of the domain. The ingress port for the message is recorded as an external port.

This process for external port list maintenance can be initiated in response to receiving an NDP message from another network node at a flow switch (Block 1301). This NDP message is a control message that is forwarded by the flow switch to the controller. The controller examines the received NDP message to determine the source of the message (Block 1303). The source can be determined from the source address in the NDP message. The source network node is compared to the list of known network nodes in the domain of the controller (Block 1305). If the source network node is not within the domain of the controller, then the port of the flow switch through which the NDP message was received is added to the list of external ports for the domain (Block 1307). The identification of this port can be provided when the NDP message is forwarded or in response to a query of the controller to the flow switch that forwarded the NDP message to the controller.

Thus, a method, system and apparatus for optimizing the handling of broadcast packets in a split architecture network is provided. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method in a network node operating as a controller for configuring a plurality of switches of a domain to efficiently forward broadcast packets, thereby reducing a number of broadcast packets forwarded within the domain, the method comprising:
    determining, by the controller based upon a use of a Neighbor Discovery Protocol (NDP), which of a plurality of active ports of the plurality of switches are a plurality of external ports that lead to network nodes outside the domain, wherein the plurality of external ports belong to a set of two or more switches of the plurality of switches, wherein the set of two or more switches includes fewer than all of the plurality of switches, wherein the determining comprises:
        determining a first set of identifiers of the plurality of active ports of the plurality of switches,
        determining a second set of identifiers of internal ports of the plurality of switches, and
        determining a difference between the first set of identifiers and the second set of identifiers;
    calculating, by the controller, a set of one or more paths, wherein the set of paths includes a path between each pair of switches of the set of two or more switches; and
    configuring each of the set of switches to forward a broadcast data packet received at an external port of the switch to all other switches of the set of switches according to one or more of the set of paths, without flooding the broadcast data packet in the domain.

2. A network node to operate as a controller and configure a plurality of switches of a domain to efficiently forward broadcast packets, thereby reducing a number of broadcast packets forwarded within the domain, the network node comprising:
    a set of one or more processors; and
    a non-transitory machine-readable storage medium containing code, which when executed by the set of one or more processors, causes the network node to:
        determine, based upon a use of a Neighbor Discovery Protocol (NDP), which of a plurality of active ports of the plurality of switches are a plurality of external ports that lead to network nodes outside the domain, wherein the plurality of external ports belong to a set of two or more switches of the plurality of switches, wherein the set of two or more switches includes fewer than all of the plurality of switches, wherein for the determination the network node is to:
            determine a first set of identifiers of the plurality of active ports of the plurality of switches,
            determine a second set of identifiers of internal ports of the plurality of switches, and
            determine a difference between the first set of identifiers and the second set of identifiers,
        calculate a set of one or more paths, wherein the set of paths includes a path between each pair of switches of the set of two or more switches, and
        configure each of the set of switches to forward a broadcast data packet received at an external port of the switch to all other switches of the set of switches according to one or more of the set of paths, without flooding the broadcast data packet in the domain.

3. A non-transitory computer-readable storage medium having computer code stored therein, which when executed by a processor of a network node operating as a controller, causes the controller to configure a plurality of switches of a domain to efficiently forward broadcast packets, thereby reducing a number of broadcast packets forwarded within the domain, causes the network node to perform operations comprising:

determining, based upon a use of a Neighbor Discovery Protocol (NDP), which of a plurality of active ports of the plurality of switches are a plurality of external ports that lead to network nodes outside the domain, wherein the plurality of external ports belong to a set of two or more switches of the plurality of switches, wherein the set of two or more switches includes fewer than all of the plurality of switches wherein the determining comprises:
  determining a first set of identifiers of the plurality of active ports of the plurality of switches,
  determining a second set of identifiers of internal ports of the plurality of switches, and
  determining a difference between the first set of identifiers and the second set of identifiers;
calculating a set of one or more paths, wherein the set of paths includes a path between each pair of switches of the set of two or more switches; and
configuring each of the set of switches to forward a broadcast data packet received at an external port of the switch to all other switches of the set of switches according to one or more of the set of paths, without flooding the broadcast data packet in the domain.

4. The method of claim 1, further comprising:
configuring each of the set of switches to forward broadcast control packets that ingress on an external port of the switch to the controller.

5. The method of claim 4, further comprising:
receiving, at the controller from a first switch of the set of switches, a first broadcast control packet received by the first switch at a first external port of the first switch; and
causing the first broadcast control packet to be forwarded by at least some of the set of switches out a remainder of the plurality of external ports exclusive of the first external port of the first switch.

6. The method of claim 1, further comprising:
generating, by the controller, a self-generated broadcast packet; and
causing the self-generated broadcast packet to be forwarded out each of the plurality of external ports of the set of switches.

7. The method of claim 1, wherein the controller utilizes the OpenFlow protocol to configure the set of two or more switches.

8. The network node of claim 2, wherein the code, when executed by the set of one or more processors, further causes the network node to:
configure each of the set of switches to forward broadcast control packets that ingress on an external port of the switch to the controller.

9. The network node of claim 8, wherein the code, when executed by the set of one or more processors, further causes the network node to:
receive, from a first switch of the set of switches, a first broadcast control packet received by the first switch at a first external port of the first switch; and
cause the first broadcast control packet to be forwarded by at least some of the set of switches out a remainder of the plurality of external ports exclusive of the first external port of the first switch.

10. The network node of claim 2, wherein the code, when executed by the set of one or more processors, further causes the network node to:
generate a self-generated broadcast packet; and
cause the self-generated broadcast packet to be forwarded out each of the plurality of external ports of the set of switches.

11. The network node of claim 2, wherein the controller utilizes the OpenFlow protocol to configure the set of two or more switches.

12. The non-transitory computer-readable storage medium of claim 3, wherein the operations further comprise:
configuring each of the set of switches to forward broadcast control packets that ingress on an external port of the switch to the controller.

13. The non-transitory computer-readable storage medium of claim 12, wherein the operations further comprise:
receiving, from a first switch of the set of switches, a first broadcast control packet received by the first switch at a first external port of the first switch; and
causing the first broadcast control packet to be forwarded by at least some of the set of switches out a remainder of the plurality of external ports exclusive of the first external port of the first switch.

14. The non-transitory computer-readable storage medium of claim 3, wherein the operations further comprise:
generating a self-generated broadcast packet; and
causing the self-generated broadcast packet to be forwarded out each of the plurality of external ports of the set of switches.

15. The non-transitory computer-readable storage medium of claim 3, wherein the controller utilizes the OpenFlow protocol to configure the set of two or more switches.

* * * * *